United States Patent

Pearson

[15] 3,680,727
[45] Aug. 1, 1972

[54] UNDERGROUND STORAGE TANK FOR LIQUIDS

[72] Inventor: Lee E. Pearson, Granville, Ohio

[73] Assignee: Owens-Corning Fiberglas Corporation

[22] Filed: Oct. 15, 1969

[21] Appl. No.: 866,558

[52] U.S. Cl. ..........................220/3, 220/71, 220/83
[51] Int. Cl. ............................B65d 7/02, B65d 7/12
[58] Field of Search............220/3, 83, 71, 5, 5 A, 71, 220/73, 18, 1 B, DIG. 23; 156/152, 180, 309; 264/250, 251, 308, 309; 150/.5

[56] References Cited

UNITED STATES PATENTS

| 3,473,688 | 10/1969 | Rosfelder | 220/5 A |
|---|---|---|---|
| 2,519,069 | 8/1950 | Roberts | 156/152 |
| 2,827,195 | 3/1958 | Kearns | 220/83 X |
| 2,973,783 | 3/1961 | Boe | 220/83 UX |
| 3,115,271 | 12/1963 | Anderson et al | 220/83 |
| 3,150,792 | 9/1964 | Bright | 220/83 X |
| 3,298,560 | 1/1967 | Anderson | 220/83 |
| 3,321,101 | 5/1967 | Griffith | 220/83 X |
| 3,335,903 | 8/1967 | Anderson | 220/83 |
| 3,368,708 | 2/1968 | Pflederer | 220/3 |
| 3,412,891 | 11/1968 | Bastone et al. | 220/83 |

*Primary Examiner*—Raphael H. Schwartz
*Attorney*—Staelin & Overman and Charles F. Schroeder

[57] ABSTRACT

An underground storage tank for fluids is made by forming hollow wall sections of reinforced plastic on a mold having a surface of double curvature, abutting the wall sections at their congruent open ends, and providing an endless reinforced plastic joint on the line of abutment. The combination of a double curvature surface and multidirectional strength provided by randomly dispersed chopped glass strands in the resin matrix, provides resistance to the crushing forces of the surrounding earth. A planar surface is either formed on or molded into the tank wall for attaching an assembly of fittings thereto.

12 Claims, 7 Drawing Figures

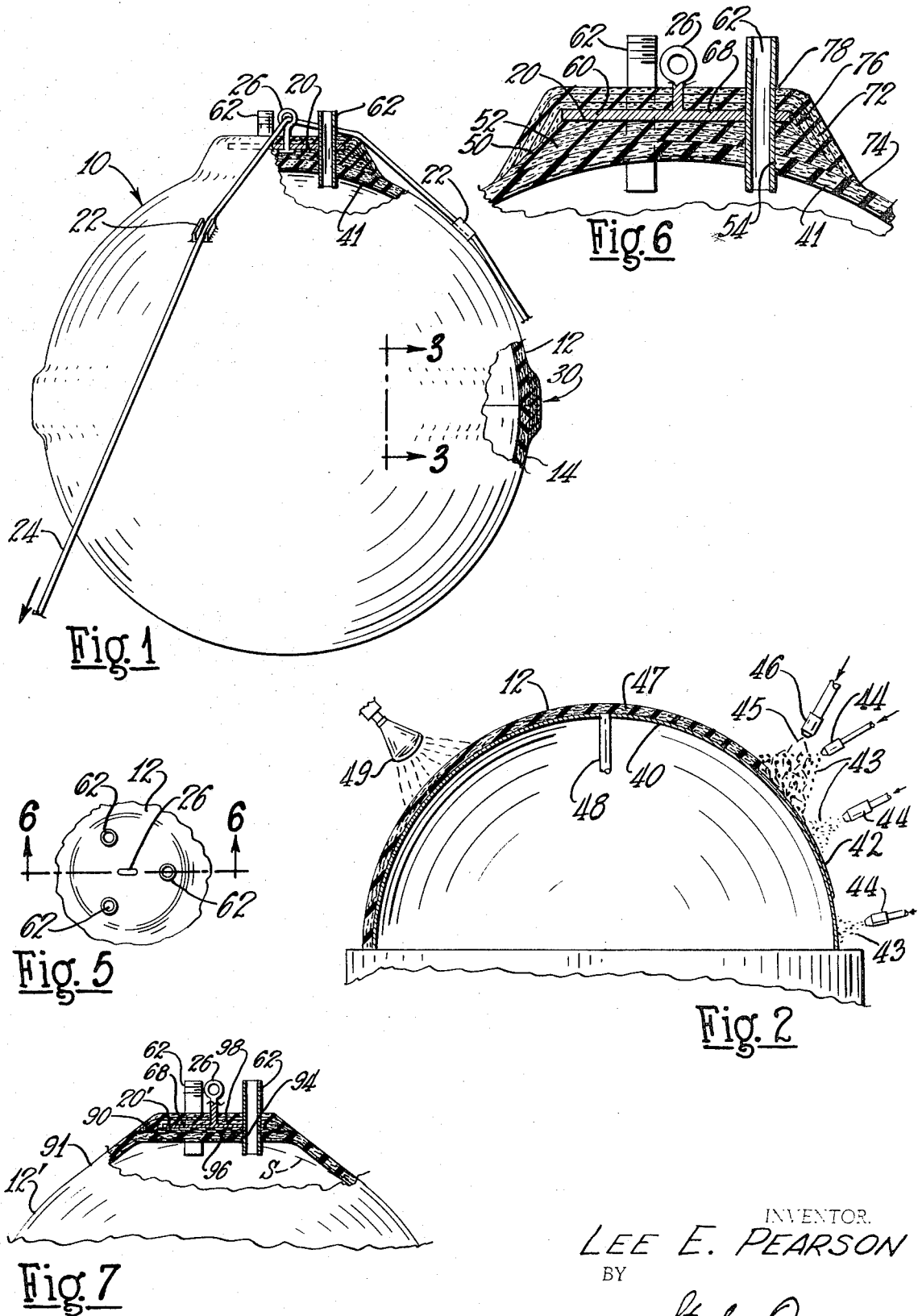

UNDERGROUND STORAGE TANK FOR LIQUIDS

INTRODUCTION

This invention relates generally to containers for corrosive fluids, and more particularly to underground storage tanks for gasoline and other petroleum products. The invention also relates to the manufacture of such underground tanks from a hardenable material such as a resin reinforced with discontinuous strands or fibers, such as chopped glass strands.

BACKGROUND OF INVENTION AND PROBLEM

Corrosion by underground fluids, such as soil acids, as well as by the liquid stored within a tank, has been a severe problem of black iron tanks heretofore used for the underground storage of liquids such as gasoline. Attempts to provide protective coatings, such as asphalt paints, have proven unsatisfactory because such coatings are susceptable to scratching or scoring during handling and shipment.

Therefore, a significant advance in the art was made with the development of reinforced plastic tanks for containing corrosive liquids for both above ground and underground installations. Because of their high degree of resistance to ambient elements, such tanks possess a potential for an extremely long life when compared to the black iron tanks.

In addition, because of their light weight, the reinforced plastic tanks result in economic savings in handling and installation.

Heretofore, the reinforced plastic tanks have generally been of the cylindrical type, i.e. having a cylindrical tubular body with concave or convex end caps. In the vast majority of these tanks, glass fibers, either in the form of continuous filament windings or as chopped strands, have been used as the reinforcing media. Because of the high tensile strength of the glass fibers when embedded in a matrix material such as a hardened resin, the composite section can be relatively thin and still provide the strength to resist the internal bursting forces.

However, because the composite wall section is so thin, it is flexible and lacks necessary stiffness to resist the radial crushing forces caused by the weight of the surrounding soil. Therefore, it has been necessary to provide somewhat sophisticated constructions for the cylindrical tanks in order to utilize the strength of glass to provide appropriate stiffness. For instance, it has been common practice to provide circumferential rib members and filament wound portions on the body of such tanks. This, of course, results in a considerably more expensive construction due to the added materials and more complex methods of manufacture.

OBJECTS

It is therefore an object of the present invention to provide an underground storage tank for fluids that, in addition to being non-corrosive and lightweight, possesses the stiffness to resist external crushing forces as well as the tensile strength to resist internal bursting forces, and which is considerably less expensive than the previously known underground containers.

It is a further object of the present invention to provide an economical method of manufacturing an underground storage tank for fluids having the properties set forth above.

BRIEF SUMMARY OF INVENTION

These and other objectives are achieved in the present invention by providing a tank wall comprising a resin matrix reinforced with discontinuous glass filaments and having an external surface that is curved in all directions. In other words, the invention takes advantage of the resistance to buckling inherent in a surface of double curvature. Examples of geometric bodies having such a surface include ellipsoids, paraboloids, ovaloids and spheres. However, for the sake of simplicity of explanation, and because of other advantages inherent in the shape itself, the following description of the invention will be confined to a tank having a substantially spherical surface. Further, the invention is described and exemplified in relation to the storage of a liquid such as gasoline, but it will be readily recognized in the art as having applicability for the storage of other fluids including gases as well.

A spherical tank is made by forming two hollow hemispherical wall sections and abutting them together. The tank walls are made of a reinforced resin and the thickness is determined by the size of the tank and the magnitude of the forces to be exerted on it. The two hemispherical sections are permanently joined together by an endless band of resin overlaying the line of abuttment and bonded to the wall sections. In addition, the tank can be provided with a partial planar surface to facilitate the attachment of desired fittings.

Because of the double curvature of the tank surface, the resistance to buckling or crushing forces is substantially greater than in the cylindrical tanks known before, and therefore the need for filament winding or reinforcing ribs is reduced or eliminated. In addition, since the volume to surface area ratio of a sphere is greater than any other geometric shape, a savings in the amount of material is also realized over the prior art constructions. The tank of the present invention offers the further advantage of having only one joint as compared to the several joints required in many of the constructions for the conventional cylindrical tank.

It has been known in the prior art to make high pressure vessels for liquids which are essentially spherical, but because of the emphasis on resistance to internal bursting forces, such vessels have been of the more complex and expensive filament wound construction. The present invention, however, comprises hemispherical wall sections made by the simple and inexpensive spray-up technique.

In the spray-up process, discrete bundles of glass filaments and resin are simultaneously sprayed on a mold or surface of a part. The proportion of resin and chopped strands are controlled so that a matrix of resin having chopped strands randomly dispersed throughout is formed.

The chopped strand reinforcement is added to the resin to form a composite material having a significantly higher modulus than that of the resin alone. The modulus of the composite is dependent on the amount of glass reinforcement added to the resin. However, since the glass reinforcement is generally more expensive than the resin material, an optimum ratio of glass to resin produces the most strength for the least cost. Where, as in the present invention, the reinforcement is in the form of discontinuous bundles of glass filaments, a ratio of 20 to 30 percent glass by weight to 70 to 80 percent resin by weight has proven to be an optimum balance of the strength and cost factors.

On the other hand, where the reinforcement comprises continuous filament windings, the ratio is generally in the range of 55 to 75 percent glass by weight to 25 to 45 percent resin by weight. Although the modulus of this composite is higher than that of the chopped strand reinforced composite, the increase in modulus is not proportional to the increased material cost. In addition, the filament winding process is considerably more expensive than the spray-up process. Therefore, where the greater tensile strength of the filament windings is not the predominant property sought, the chopped strand reinforced composite is preferred. As mentioned earlier, the double curvature of the wall of a spherical tank provides a greater resistance to buckling than do other geometric shapes. In designing an underground tank to withstand crushing forces of the surrounding soil, the wall thickness is determined by the following formula:

$$\sigma C_r = KE \frac{t^2}{r^2}$$

wherein:
$\sigma_{cr}$ = critical buckling strength
K = a constant
E = modulus of elasticity of the wall material
r = radius of the tank
t = the wall thickness of the tank.

It is apparent from the foregoing formula that the resistance to buckling of the cured wall varies with the square of the wall thickness, but only directly with the first power of the modulus of elasticity of the wall material. Although a resinous wall reinforced with continuous filament windings would have a greater modulus of elasticity, it is more desirable to increase the thickness of the wall by spraying additional resin with chopped reinforcements than to resort to the more expensive filament winding construction. Therefore, the spray-up construction proves more desirable for the construction of a spherical tank where the buckling strength is the predominant property.

In addition to the economic advantages of using this composite, the use of discontinuous filaments or fibers as the reinforcing component offers other advantages over the continuous filament windings construction. When discontinuous filaments or chopped strands are sprayed on the mold or other surface simultaneously with the liquid resin, they tend to align substantially parallel to the surface of the mandrel but randomly oriented in all other directions. Consequently, the tensile strength of the resinous wall is improved in all directions parallel to its surface. At the same time the randomly oriented chopped strands provide dimensional stability in all directions. Some of the chopped strands will fall upon other chopped strands previously deposited and will thereby be slightly oblique to the surface of the wall. This provides sufficient radial reinforcement to insure the integrity of the wall throughout its thickness.

Furthermore, although in the following discussion the invention will be discussed with reference to a tank made of a synthetic resin reinforced with glass fibers, it is contemplated that other materials are within the scope of the invention, particularly other reinforcements having the desired strength characteristics. For instance, other reinforcements, such as glass, or other mineral, or organic fibers, or organic textile materials may be used as the reinforcement.

However, discontinuous bundles of glass filaments or chopped glass strands are preferred for several reasons. First, the uniformity of filament diameter along a given filament formed by mechanical attenuation is desirable over the tapered ends found on glass and mineral fibers formed by the gaseous or centrifugal attenuation processes. Second, the higher modulus strength of glass makes it preferable over the organic fibers and filaments. Third, glass filaments in the form of discontinuous bundles are easier to handle and apply than a mass of individual fibers and filaments.

Thermoplastic as well as thermosetting resins may be used, although the latter type is preferred because of the generally higher strength and thermal stability offered by these resins. The isophthalic polyester resins are particularly well suited for this application because of their high strength and high resistance to corrosion.

DESCRIPTION OF DRAWINGS

Having then briefly described the present invention, a more detailed description follows with reference to the accompanying drawings forming a part of this specification, of which:

FIG. 1 is a side elevational view, partly in section, of an underground storage tank for liquids made in accordance with the invention;

FIG. 2 is an elevational view, partly in section, showing a method of forming on a mold the wall section used in making the spherical tank of FIG. 1;

FIG. 5 is a plan view of the top of the tank shown in FIG. 1 showing the arrangement of the fittings attached thereto;

FIG. 6 is an enlarged section of the top wall section of the tank in FIG. 1 showing the construction of an elevated pad and the fitting assembly attached thereto, and is taken along the line 6—6 in FIG. 5; and FIG. 7 is a side elevational view, partly in section, of another wall section for an underground storage tank made in accordance with the invention, having an integral planar surface for attaching a fitting assembly thereto.

Figure 4:
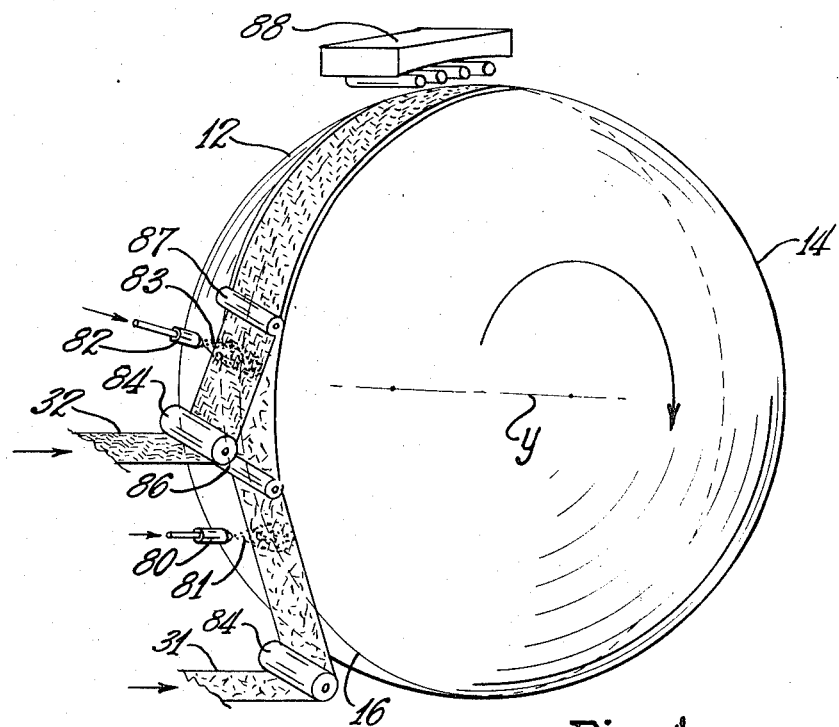
FIG. 4 is a schematic elevational view showing a method of applying the joint construction of FIG. 3.

It is understood that the invention is not limited in its application to the details of construction and arrangement of parts illustrated in the accompanying drawings since the invention is capable of other embodiments and of being practiced or carried out in various ways. Although, as mentioned above, the invention is exemplified by description of a spherical tank, it is applicable to the other geometric shapes mentioned as well.

With this in mind, one embodiment of the present invention is shown in FIG. 1 wherein a spherical underground tank is designated generally at 10. The tank comprises an upper hemispherical wall section 12 and a lower hemispherical wall section 14 made of a hardened synthetic resin in which chopped glass strands are randomly dispersed for reinforcement. The two hemispherical wall sections 12 and 14 are butted together so that the annular edges at the open ends of the sections correspond thereby forming a peripheral line of abuttment 16. A reinforced resin joint 30 is disposed on the line of abuttment 16. The upper wall section is provided with a planar surface 20 for attaching a fitting assembly 60 which will be discussed in more detail hereinafter.

The wall sections 12 and 14 are formed by spraying chopped glass strands and liquid resin on the surface of a mold and then curing the resin to a hardened state to form a rigid structure. This process is shown in FIG. 2 wherein a wall section 12 or 14 is formed on the convex surface of a hemispherical mold 40.

A coating of a suitable release agent is first applied to the mold surface by a suitable applicator, not shown.

Because glass is subject to some corrosive attack by certain additives occasionally found in gasolines, it is desirable to insure that the inner surface of a tank is resin rich; i.e., a purely resinous surface with little or no exposed glass reinforcement. Therefore, the second step in forming the wall section is to spray resin 43 on the mold 40, apply a thin surfacing mat 42, and further apply additional resin to form a resin rich inner surface 41. The surfacing mat 42 comprises a thin mat of individual glass filaments randomly disposed and bonded at their interstices by a suitable binder, such as a polyester resin. The resulting resin rich inner surface is about 85 to 95 percent by weight resin.

The surfacing mat 42 is used to stabilize the liquid resin during the build-up of the resin rich surface. The surfacing mat also provides reinforcement and dimensional stability for the resin rich surface after the resin has been cured. However, it appears that if process control is exercised to insure a complete coating of resin on the inner surface of the wall section, the surfacing mat 41 may not be required.

After the resin rich surface has been applied to the mold, the chopped strand reinforced resin wall 47 is built up. The chopped strand reinforcement 45 is supplied by a gun 46 which chops the strand and propels it by blowing toward the exterior surface of the mold 40. Simultaneously as the chopped strand is flying through the air, a resin gun 44 produces a surrounding mist of liquid resin 43 also directed toward the mold surface. The output of the chopped strand gun 46 and the resin gun 44, as well as the rate of traverse of the two guns, control the thickness of the wall of resin 47 which is formed.

It is generally preferred to form a wall section of uniform thickness. However, a not infrequent problem encountered by plastic underground tanks has been the tendency of attendants to drop measuring rods into the tank, whereupon the highly concentrated impact force has produced punctures in the tank wall. When this problem is anticipated, additional resin and reinforcement can be sprayed on a region of the lower wall section 14 to increase its impact resistance.

As explained earlier, the discrete lengths of chopped strands 45 will randomly orient substantially parallel to the surface of the mold 40, thereby providing reinforcement in the desired directions. Although any reasonable length of strand will work, it is found that chopped strands between one-fourth and 2 inches in length are particularly suitable for good surface conformability and ease of application.

When the mold 40 is stationary as shown in FIG. 2, it is necessary to traverse the resin guns 44 and the chopped strands gun 46 across an imaginary spherical surface radially spaced from the surface of the mold. This technique is suitable where the spraying equipment is operated manually.

As an alternative to this arrangement, the mold can be rotated about an axis and the spraying equipment traversed in an arc laying in a single plane. This arrangement is better suited for us with automatic spraying equipment.

Although the mold 40 shown in FIG. 2 is hemispherical in shape, other appropriately shaped molds can be used to make wall sections for tanks having the other geometric shapes mentioned earlier.

In most cases, the resin 43 is self-curing with the passage of time. However, the rate of cure may be accelerated by the addition of catalysts or by supplying a radiant heat source 49 as shown in FIG. 2.

After the wall section 12 or 14 is cured to a structurally self-supporting state, it is removed from the mold. In some instances, an assist from a jet of air introduced between the surface of the mandrel 40 and the wall section is needed. The conduit 48 built into the mold is used for this purpose.

Once the wall sections 12 and 14 have been formed they are placed with their open ends in coterminous abutting relationship. The wall sections are then secure together by a joint disposed around the line of abuttment 16 such as the joint indicated generally at 30 in FIG. 1 and shown in greater detail in FIG. 3.

The joint 30 comprises alternate layers of chopped strand mat and woven roving in the form of narrow bands in a matrix of cured resin. The edge regions of the wall sections are sanded to provide a better bonding surface for the joint. Because chopped strand mat more readily conforms to the curved surface, it is preferred for the first layer 31. A woven roving is used in succeeding alternate layers 32 and 34 because of its inherent strength, to provide a joint as strong as or stronger than the tank walls 12 and 14. Additional layers of chopped strand mat 33 are optionally provided between layers of woven roving to facilitate a smoother joint build-up. The layers of chopped strand mat are slightly wider than the layers of woven roving so that they drape over the edges of the joint and provide a smoother transition to the tank wall. A layer of chopped strand 35 is provided as the last layer to present a smooth exterior surface.

The method of applying the joint 30 is shown schematically in FIG. 4. The wall sections 12 and 14 are held in abutting relationship by a suitable apparatus such that they can be rotated about an axis Y perpendicular to the plane of abuttment.

The first layer of chopped strand mat 31 is then applied to the line of abuttment 16 as the wall sections rotate about the axis Y. The width of the mat 31 is determined by the particular application. In the case of a 1,650 gallon tank, which measures approximately 7 feet 8 inches in diameter and having a nominal wall thickness of 0.34 inches, a width of 8 to 12 inches appear adequate.

This mat 31 is supplied from a roll, or other convenient supply (not shown), and passes around a tensioning roller 84 before contacting the wall sections. A liquid resin 81 is sprayed by a gun 80 on the mat soon after the mat comes in contact with the wall sections, and is supplied in sufficient quantity to saturate the mat. A pressure roller 86 is used to smooth out the mat and remove trapped air, thereby insuring a leakproof bond.

Next a layer of woven roving 32 is applied while the chopped strand mat 31 is still wet. The woven roving layer, which as mentioned before, is slightly narrower than the mat layer, is sprayed with resin 83 from another resin gun 82 and saturated in the manner previously described. Again, a pressure roller 87 is used to smooth out the woven roving and remove trapped air.

Figure 3:
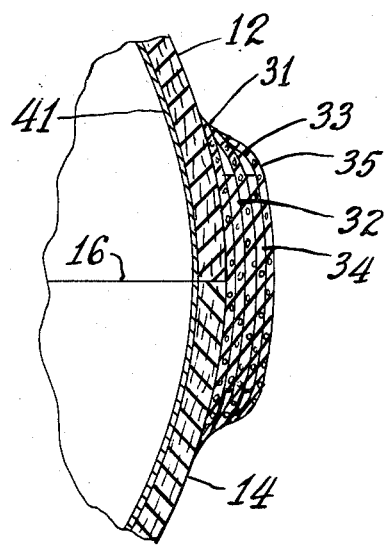
FIG. 3 is an enlarged section of the joint construction for the tank of FIG. 1, taken along the line 3—3 in FIG. 1.

Upon completion of at least one full revolution of the tank, the chopped strand mat 31 and woven roving 32 are cut and the ends rolled out by the rollers 86 and 87. If a stronger joint is required additional layers of chopped strand mat, such as layers 33 and 35 in FIG. 3, and woven roving, such as layer 34 in FIG. 3, are applied in the same manner. With the proper arrangement of equipment, including supply rolls, spray guns, etc., a plurality of layers can be applied during a single revolution.

A radiant heat source 88 is provided to accelerate the cure if desired. Where a multilayer joint is to be formed, it may be desirable to restrain the application of heat until all the layers of reinforcement and resin have been applied to allow the resin to flow through the reinforcement and form a matrix.

In addition to its inherent high strength, the reinforced resin joint, as just described, offers the further advantage of being fluid tight. The impermeability of the resin matrix and the integral bond formed between the resin and the wall sections of the tank provide a perfect seal.

Although the joint described and shown in FIG. 3 has three layers of chopped strand and two layers of woven roving, in practice the number of layers of reinforcement in the joint are determined by the size of the tank and the forces it must withstand. The joint 30, as shown, has proven suitable for a spherical tank approximately 7 feet, 8 inches in diameter and capable of holding 1,650 gallons of liquid. As well as a greater or lesser number of layers of chopped strand mat and woven roving, it is also understood that other arrangements of the layers may be used, and that other reinforcement forms, such as a bonded glass mat or scrim fabric, might be used.

An alternative joint for the tank 10 might comprise a resin matrix reinforced with a helically wound continuous glass yarn. The number of layers of the filament windings would again be determined by the strength requirements.

Referring again to FIG. 1, the spherical tank 10 is provided with an assembly of fittings 60 comprising three couplings or threaded conduits 62 affixed to a plate. The arrangement of these conduits is shown in FIG. 5. Three conduits are shown in this embodiment for connecting a fill line, a suction or pumping line and a vent line with the interior of the tank. More or less fittings are provided to suit the needs of the user. Also attached to the fitting base 68 is a handling lug 26 suitable for use in lifting the tank by a hoist, etc.

FIG. 6 shows the manner in which the fitting assembly is attached to the tank 10. A planar surface 20 is provided on the tank wall section 12, by a build-up pad comprising successively smaller layers of reinforcement 52 saturated with a resin. The reinforcement layers 52 are similar in shape to the fitting base 68 and may comprise chopped strand mat, woven roving, scrim cloth or any other suitable form of reinforcement. Chopped strand mat has been shown in FIG. 6, and is particularly suitable because of good conformability.

As an alternative method of providing the elevated planar surface, the spray-up technique can be used wherein chopped glass strands and resin are sprayed on the surface of the tank to build up the pad 50.

The fitting assembly 60 is installed by disposing the fitting base 68 on the planar surface 20. The fitting assembly should be placed on the planar surface before the resin in the built-up pad has cured so that a bond is formed between the metal fitting base 68 and the built-up pad 50. The conduits 62 are welded to the base 68 and depend from both faces thereof. These conduits extend into the interior of the tank through openings 54 provided in the wall section 12 and built-up pad 50.

Additional layers of reinforcement 72, such as chopped strand mat, are disposed over the fitting base 68. The layers 72 extend beyond the edges of the fitting base 68 and drape down onto a portion of the tank wall. Each successive layer is slightly larger than the preceding layer so that a smooth transition takes place with the curve of the wall section 12 as indicated at 74. The layers of reinforcement 72 are provided with openings to fit over the conduits 62 and eyebolt 26. The layers are thoroughly wetted with resin and upon curing the resin becomes an integral part of the container 10. Consequently, the fitting base 68 is embedded in a reinforced resin structure.

Liquid resin with a thickening agent added to increase its viscosity is used to fill voids, such as shown at 76, and to seal around the conduits as indicated at 78.

The build-up of the pad 75 on the surface of the container 10 requires no disruption of the spherical surface and therefore no stress concentration regions result. In addition, since both wall sections are hemispherical, a single mold can be used to form both parts.

However, FIG. 7 shows another tank wall section 12' made in accordance with the invention, wherein the planar surface 20' is formed as an integral part of the tank wall. The planar portion of the wall section 90 is formed tangent to the theoretical projection of the spherical inner surface $S$ of the wall section 12'. The wall section 12' is made by the process described in discussing FIG. 2, wherein, however, the mold 40 is provided with a frusto-conical attachment disposed thereon. The wall section 12' has a frusto-conical transitional section 91 which converts vertical forces on the planar surface 20' into compressive forces on the spherical portion of the wall section. Despite this design feature, the buckling strength of the planar portion of the wall is less than the rest of the wall section. For this reason, it is preferable that the planar portion be limited to an area necessary to accomodate the fitting base 68.

Again, as was described in relation to the attachment of the fitting assembly in FIG. 6, it is recommended that the fitting base 68 be applied to uncured resin so that upon curing the resin a strong bond is formed between the fitting base and the tank wall. However, since the planar portion of the tank wall is formed and cured on the mold along with the rest of the wall section 12', it is desirable to dispose a layer of reinforced uncured resin on the planar surface 20' before attaching the fitting assembly. The planar surface 20' is first sanded to roughen the surface. Then one or more layers of chopped strand mat 96, wetted with resin are disposed on the planar surface.

Openings 94 are provided in the mats 96, and in the planar portion of the tank wall 90, to receive the conduits 62. Layers of chopped strand mat 98, wetted with resin and provided with openings to fit over the conduits 62, are placed over the fitting base 68 and integrally bonded to the tank wall section 12'.

Although the planar surfaces 20 and 20' in FIGS. 6 and 7 respectively are shown parallel to the line of abuttment 16, they can equally as well be provided anywhere on the surface of the tank in relation to the line of abuttment 16. Additionally, planar surfaces have been shown because it is likely that the fitting base 68 will be flat. However, if it is deemed advisable to provide the fitting plate with a different shape, a matching configuration may be provided on the tank surface instead of the planar surface 20 or 20'.

The underground storage tank 10 shown in FIG. 1 and as just described is well suited for most installations. However, in some cases special problems are encountered in using underground plastic tanks. One such problem is the tendency of an empty tank to float when the water table rises. Where flotation of the tank is anticipated, the tank is anchored to the ground with cables. Therefore, the tank 10 of FIG. 1 is provided with strap guides 22 for positioning the anchoring cables 24. The strap guides comprise a channel shaped member attached to the tank with an overlaying band of chopped strand mat wetted with resin and bonded to the tank wall. In addition to keeping the cables 24 properly positioned, the guides 22 prevent abrasion of the tank wall caused by movement of the cables.

We claim:

1. An underground storage tank for fluids, comprising:
    two wall sections of hardenable resin reinforced with randomly dispersed bundles of discontinuous glass filaments, each wall section having a concave inner surface and a hemispherical outer surface, and each wall section further having an open end, wherein the open end of one wall section is disposed in coterminous abutting relationship with the open end of the other wall section forming an endless line of abuttment on the surface of the tank; and means joining said wall sections comprising an endless band of reinforced resin overlaying said line of abuttment and integrally bonded to said wall sections.

2. An underground storage tank for fluids, comprising:
    two wall sections of hardenable resin reinforced with randomly dispersed bundles of discontinuous glass filaments, each wall section having an concave inner surface and a hemispherical outer surface and further having an open end, wherein the open end of one wall section is disposed in coterminous abutting relationship with the open end of the other wall section forming an endless line of abuttment on the surface of the tank; and
    means for permanently joining said wall sections comprising an endless band of resin reinforced with glass filaments overlaying said endless line of abuttment and integrally bonded to said wall sections.

3. An underground storage tank for fluids, as recited in claim 2, wherein the portion of said wall sections immediately adjacent their inner surfaces is substantially all resin covering a thin underlayer of randomly distributed filaments.

4. An underground storage tank for fluids, as recited in claim 2, wherein said bundles of discontinuous glass filaments are predominately oriented parallel to the outer surface of said wall section.

5. An underground storage tank for fluids, as recited in claim 3, wherein the portion of said wall sections immediately adjacent their inner surfaces comprises 85 to 95 percent by weight resin reinforced with a thin mat of randomly oriented individual glass filaments.

6. An underground storage tank for fluids, as recited in claim 5, wherein the remainder of said wall sections comprises between 25 and 45 percent by weight resin and between 55 and 75 percent by weight bundles discontinuous of glass filaments randomly dispersed throughout said resin.

7. An underground storage tank for fluids recited in claim 2 wherein said endless band of reinforced resin comprises a layer of chopped strand mat saturated with resin and disposed adjacent said wall sections.

8. An underground storage tank for fluids, as recited in claim 7, wherein said endless band of reinforced resin further includes a layer of woven roving saturated with resin and disposed upon said layer of chopped strand mat.

9. An underground storage tank for fluids, as recited in claim 2, wherein
    one of said wall sections has a partial planar surface for receiving attachments thereon, the area of said partial planar surface being small in proportion to the overall surface area of said wall section; and further,
    wherein said wall section has at least one opening extending from the exterior of said planar surface to the interior of the tank for receiving a conduit.

10. An underground storage tank for fluids, as recited in claim 9, including:
    a fitting assembly comprising a base disposed on said partial planar surface, and at least one fluid conduit depending from said base and extending into said opening in said wall section; and
    means for securing said fitting assembly to said wall section.

11. The underground storage tank for fluids recited in claim 10, wherein,
    said means for attaching said fitting assembly comprises a layer of hardened resin reinforced with discrete bundles of glass filaments, disposed over and extending beyond the boundaries of said fitting base, wherein said extended portion of said reinforced resin layer is integrally bonded to said wall section.

12. An underground storage tank for fluids, as recited in claim 9, wherein said planar surface is provided by a built-up pad of resin reinforced with chopped glass strands disposed on and integrally bonded to said wall section.

* * * * *